(12) United States Patent
Jones et al.

(10) Patent No.: US 9,633,158 B1
(45) Date of Patent: Apr. 25, 2017

(54) SELECTABLE RECONFIGURATION FOR DYNAMICALLY RECONFIGURABLE IP CORES

(71) Applicant: ALTERA CORPORATION, San Jose, CA (US)

(72) Inventors: Jakob Raymond Jones, San Jose, CA (US); Prasanna Padmanabhan, Fremont, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 14/538,784

(22) Filed: Nov. 11, 2014

(51) Int. Cl.
| | | |
|---|---|---|
| H01L 27/118 | (2006.01) | |
| G06F 17/50 | (2006.01) | |
| H01L 27/02 | (2006.01) | |
| G06F 15/80 | (2006.01) | |
| H01L 27/115 | (2017.01) | |
| H01L 23/528 | (2006.01) | |

(52) U.S. Cl.
CPC ...... *G06F 17/5068* (2013.01); *H01L 27/0207* (2013.01); *G06F 15/8015* (2013.01); *G06F 17/50* (2013.01); *H01L 23/528* (2013.01); *H01L 27/115* (2013.01); *H01L 27/118* (2013.01); *H01L 27/11807* (2013.01)

(58) Field of Classification Search
CPC ........... H01L 27/0207; H01L 27/11807; H01L 27/118; H01L 23/528; H01L 27/115; H01L 27/11896; H01L 2924/14; H01L 24/06; H01L 23/50; G06F 17/50; G06F 15/7867; G06F 15/8015; G06F 17/5054; H03K 19/11836; H03K 19/17748; H03K 19/17796
USPC ................ 257/202, 203, 204, 211, E23.002; 438/128, 587, 598; 716/116, 121, 128
See application file for complete search history.

(56) References Cited

U.S. PATENT DOCUMENTS

| | | | |
|---|---|---|---|
| 5,109,503 A * | 4/1992 | Cruickshank | H03K 21/00 703/24 |
| 6,912,706 B1 | 6/2005 | Stamm et al. | |
| 7,310,794 B1 * | 12/2007 | Squires | G06F 17/5054 716/117 |
| 7,979,827 B1 | 7/2011 | Trimberger et al. | |
| 8,635,571 B1 * | 1/2014 | Goldman | G06F 17/5054 716/116 |
| 8,786,310 B1 | 7/2014 | Lu et al. | |
| 8,917,111 B1 | 12/2014 | Puranik | |
| 9,268,578 B2 * | 2/2016 | Cummings | |
| 2006/0190904 A1 * | 8/2006 | Haji-Aghajani | G06F 17/5054 326/38 |

(Continued)

*Primary Examiner* — Thinh T Nguyen
(74) *Attorney, Agent, or Firm* — Fletcher Yoder, P.C.

(57) ABSTRACT

Systems and methods for reconfiguration of a hardened intellectual property (IP) block in an integrated circuit (IC) device are provided. Reconfiguration of the hardened IP block in the IC device may transition between functions supported by the hardened IP block. A transition may occur as a pre-configured profile is selected to reconfigure the hardened IP block. Further, configuration data associated with each of the pre-configured profiles of the hardened IP block may be generated and storage space to store the configuration data may be created. Additionally, reconfiguration control logic to read and implement the configuration data in hard IP design primitives may also be generated.

21 Claims, 4 Drawing Sheets

(56) References Cited

U.S. PATENT DOCUMENTS

| | | | |
|---|---|---|---|
| 2009/0070728 A1* | 3/2009 | Solomon | G06F 17/5045 716/128 |
| 2011/0302356 A1 | 12/2011 | Helton | |
| 2012/0117363 A1* | 5/2012 | Cummings | H04W 8/22 713/1 |
| 2013/0297907 A1 | 11/2013 | Ki et al. | |
| 2014/0181489 A1 | 6/2014 | Vicente et al. | |

* cited by examiner

SELECTABLE RECONFIGURATION FOR DYNAMICALLY RECONFIGURABLE IP CORES

BACKGROUND OF THE INVENTION

The present disclosure relates generally to integrated circuits, such as field programmable gate arrays (FPGAs). More particularly, the present disclosure relates to methods to reconfigure hardened intellectual property (IP) blocks of integrated circuits in an efficient manner.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Modern FPGAs also may contain hardened IP blocks. The hardened IP blocks either provide device features that are not implemented in an FPGA core fabric for performance reasons or offer a significant cost or size reduction via feature implementation in the hardened IP blocks. Features that may be implemented on the hardened IP blocks may include hardened memory controllers, digital to analog controllers, analog to digital controllers, phase locked loops, transceivers, High-Speed Serial Interfaces (HSSI), Physical Coding Sublayer (PCS), Physical Medium Attachment (PMA), and the like.

In modern ICs such as FPGAs, there has been limited ability for designers to modify hardened IP blocks at runtime to change behavior or functionality of the hardened IP blocks. The limited modification process for the hardened IP blocks is known as dynamic reconfiguration. Further, modifications derived from dynamic reconfiguration may have involved a great deal of iteration by the designer as well as manual inspection of hardware description language (HDL) code for identifying registers of the hardened IP blocks that are actually modified for a desired function. Accordingly, tool flows that enable the designers to accomplish dynamic reconfiguration may be generally time consuming, error-prone, and complicated to implement and debug.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for reconfiguring hardened intellectual property blocks for integrated circuits (ICs). In particular, the present embodiments may provide platforms for ICs (such as FPGAs), such that the hardened IP blocks may be reconfigured in an efficient manner. Further, the present embodiments relate to software development to facilitate reconfiguration between configuration profiles of the hardened IP blocks to provide low level reconfiguration with high level hardware description language (HDL) coding. For example, in one embodiment, a platform developer may create several configuration profiles for the hardened IP blocks using HDL coding, and a design software program may enable mapping the configuration profiles to register settings of an FPGA and implementing the register settings on the FPGA as a reconfigured hardened IP block.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry and/or machine-readable instructions stored on a tangible, non-transitory, machine-readable medium for enabling reconfiguration of hardened intellectual property (IP) design primitives of an integrated circuit (IC). In particular, reconfiguration of the hardened IP design primitives of an IC may be used to transition between various logic functions of hardened IP blocks within the IC. For example, the hardened IP block logic functions may include hardened memory controllers, digital to analog controllers, analog to digital controllers, phase locked loops, transceivers, High-Speed Serial Interfaces (HSSI), Physical Coding Sublayer (PCS), Physical Medium Attachment (PMA), and the like. The reconfiguration of the hardened IP design primitives may enable efficient transitions between the various logic functions of the hardened IP block.

Figure 1:
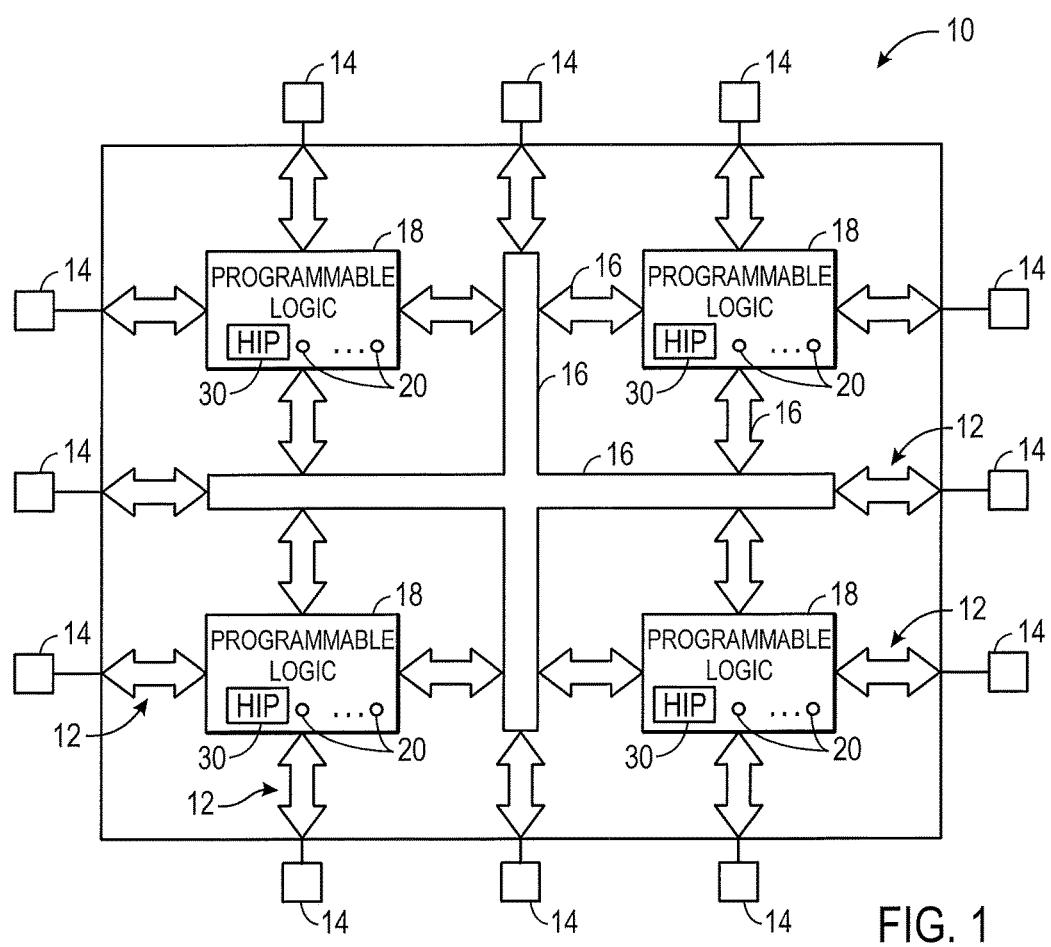
FIG. 1 is a block diagram of a programmable logic device that may include logic to reconfigure hardened intellectual property (IP) design primitives, in accordance with an embodiment.

With the foregoing in mind, FIG. 1 illustrates an IC device 10, which may be a programmable logic device, such as a field programmable gate array (FPGA). For the purposes of this example, the device 10 is referred to as an FPGA, though it should be understood that the device may be any type of programmable logic device. As shown, FPGA 10 may have input/output circuitry 12 for driving signals off of the FPGA 10 and for receiving signals from other devices via input/output pins 14. Interconnection resources 16, such as global and local vertical and horizontal conductive lines and buses, may be used to route signals on the device 10. Additionally, interconnection resources 16 may include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. In various embodiments, the programmable logic 18 may be configured to perform a custom logic function. The programmable interconnects associated with interconnection resources may be considered to be a part of programmable logic 18. Further, the FPGA 10 may include programmable logic 18 that enables reconfiguration of the FPGA 10, such that hardened IP blocks 30 may be altered and/or swapped during the runtime of the FPGA 10.

Programmable logic devices (PLDs), such as the FPGA 10, may contain programmable elements 20 within the programmable logic 18. For example, a designer may program (e.g., configure) the programmable logic 18 to perform one or more desired functions. By way of example, some programmable logic devices may be programmed by configuring their programmable elements 20 using mask programming arrangements, which is performed during semiconductor manufacturing. Other programmable logic devices are configured after semiconductor fabrication operations have been completed, such as by using electrical programming or laser programming to program their programmable elements 20. In general, programmable elements 20 may be based on any suitable programmable technology, such as fuses, antifuses, electrically programmable read-only-memory technology, random-access memory cells, mask-programmed elements, and so forth.

Figure 2:
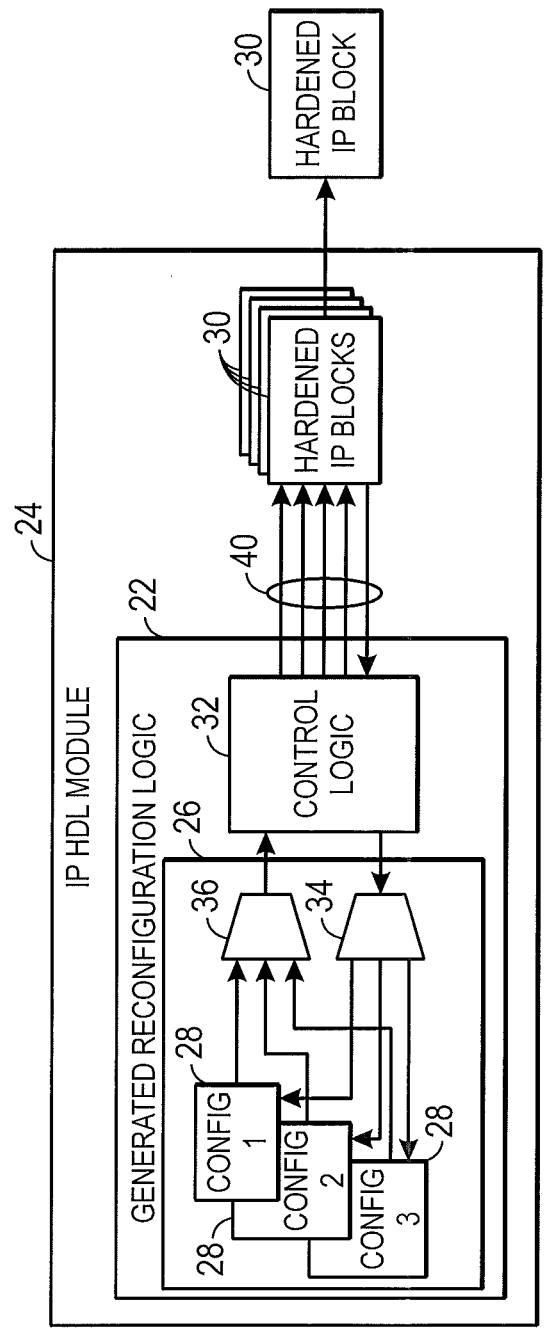
FIG. 2 is a block diagram of an IP hardware description language (HDL) utilized to reconfigure the programmable logic device of FIG. 1, in accordance with an embodiment.

As discussed above, the FPGA 10 may allow a designer to create a customized design capable of executing and performing customized functionalities. Each design may have its own hardware implementation to be implemented on the FPGA 10. For instance, a single hardware implementation may be used for each functionality in a design for the FPGA 10. Further, as discussed in more detail below in FIGS. 2 and 3, the programmable logic 18 of the FPGA 10 may enable reconfiguration of hardened IP blocks 30 of the FPGA.

The programmable logic 18 of the FPGA 10 may represent a number of programmable components on the FPGA 10. For example, in FIG. 2, the programmable logic 18 may be represented by reconfiguration logic 22 within an intellectual property hardware description language (IP HDL) module 24. The reconfiguration logic 22 may implement storage for parameter configurations 28 (e.g., configurations of the programmable elements 20) provided by a designer within a memory 26. Further, the parameter configurations 28 may represent parameter settings that the IP HDL module 24 utilizes to reconfigure a hardened IP block 30 of the FPGA 10, as discussed in more detail below. As the parameter configurations 28 are provided by the designer, the IP HDL module 24 may store the parameter configurations 28 within the memory 26. While the memory 26 is illustrated as ROM in FIG. 2, it may be appreciated that the memory 26 may also take the form of RAM, registers, LUTs, or any other memory device.

Additionally, upon storing the parameter configurations 28 within the memory 26, the IP HDL module 24 may control reconfiguration of the hardened IP block 30 via control logic 32. The control logic 32 may select a specific configuration profile 28 based on received instructions from the designer. The selection may occur through a demultiplexer 34 coupled to each of the parameter configurations 28. After selecting the specific configuration profile 28, the memory 26 may provide the specific parameter configuration 28 via a multiplexer 36 to the control logic 32. Subsequently, the control logic 32 may supply the specific parameter configuration 28 to the hardened IP blocks 30. The hardened IP blocks 30 may include the parameter settings that can be set by a high level programming language such as Verilog HDL, SystemVerilog, VHDL, or the like.

Further, the parameter configurations 28 may interact with a reconfiguration interface 40 to alter the parameter setting of the hardened IP blocks 30. The reconfiguration interface 40 may determine, along with the control logic 32, which of the parameter settings of the hardened IP blocks 30 are changed based on the intended functionalities of the parameter configurations 28. Additionally, upon mapping the parameter configuration 28 to the parameter settings of the hardened IP blocks 30, individual hardened IP blocks 30 may be implemented by the IP HDL module 24 to complete the reconfiguration of the individual hardened IP block 30.

Figure 3:
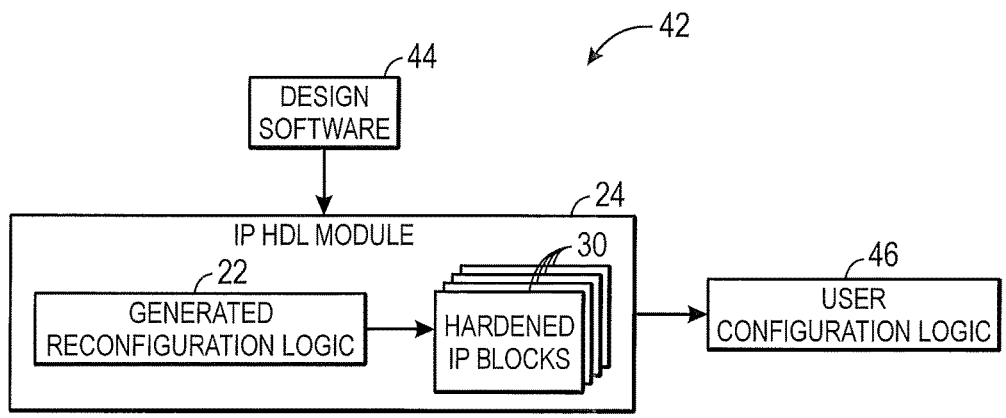
FIG. 3 is a block diagram of a system that utilizes user reconfiguration logic to execute reconfiguration of the hardened IP design primitives of FIG. 1, in accordance with an embodiment.

Expanding upon the IP HDL module 24, FIG. 3 is a block diagram of a system 42 for transitioning between the parameter configurations 28 for the hardened IP block 30 of the FPGA 10. A designer may wish to efficiently and dynamically transition between functions of the hardened IP block 30 at runtime after the designer compiles several different parameter configurations 28 in the memory 26 of the IP HDL module 24. To reduce time costs from compilation and debugging, design software 44 (e.g., a "wizard" software program) may enable the designer to create several configuration profiles for the hardened IP block 30, which may represent several parameter configurations 28 of the hardened IP block 30. Additionally, the design software 44 may analyze the configuration profiles to determine the parameter settings for programmable elements of the FPGA 10, such as sets of registers within the FPGA 10. In this manner, the design software may interpret functionalities intended by the configuration profiles, and determine how the configuration profiles correspond to the actual programmable elements 20 of the FPGA 10. For example, in the FPGA 10, the configuration profiles may determine which register settings of the sets of registers of the FPGA 10 carry out the intended functions of the configuration profiles. Using the design software 44, the designer may not have to search a register map of the FPGA 10 to write reconfiguration control logic. Instead, the design software 44 may map the configuration profiles via the reconfiguration interface 40 and reconfiguration logic 22 to the appropriate programmable elements 20 of the FPGA 10.

Further, the design software 44 may produce the IP HDL module 24. The IP HDL module 24 may implement storage for the various configuration profiles developed by the designer and also implement the reconfiguration logic 22 generated by the design software 44. For example, after the design software 44 receives the configuration profiles from the designer, the design software 44 may create the IP HDL module 24, map the configuration profiles to parameter configurations 28 of the hardened IP blocks 30, and store the parameter configurations 28 in some form of memory (e.g., read-only memory (ROM), random access memory (RAM), registers, or look-up tables (LUTs)). Upon storing the parameter settings, the design software 12 may also generate the reconfiguration logic 22 that enables a smooth transition between the various parameter configurations 28 established by the configuration profiles.

Further, the reconfiguration logic 22 may interact with the configuration profiles to determine logical paths between parameter settings established by the design software 44 and the hardened IP blocks 30. The hardened IP blocks 30, as mentioned above, may include parameters that can be set by a high level programming language such as Verilog HDL, SystemVerilog, VHDL, or the like. For example, the design software 44 may set parameters of the hardened IP blocks 30 based on the configuration profiles provided by the developer. Once the hardened IP blocks 30 are set, an IC device such as the FPGA 10 may use the hardened IP blocks 30 to reconfigure portions of the FPGA 10 to the parameter settings provided by one or more of the hardened IP blocks 30.

Upon setting the parameters of the hardened IP blocks 30, the reconfiguration logic 22 may determine the logical paths between the hardened IP blocks 30. This may involve determining differences between the various parameter settings associated with the individual hardened IP blocks 30, and, upon reconfiguring the hardened IP block 30, dynamically changing only the parameter settings that are different between the hardened IP blocks 30 upon reconfiguration. Thus, only differing individual parameter settings may change in place of reconfiguring an entire set of parameter settings of the hardened IP block 30.

Furthermore, user configuration logic 46 may also be generated by the design software upon determining the logical paths between the hardened IP blocks 30 via the reconfiguration logic 22. The user configuration logic 46 may enable the designer to select from the configuration profiles pre-loaded into the system 42. For example, the pre-loaded configuration profiles representing various functions may be presented to the designer, and the designer may select which of the functions is desired. Upon selecting the desired function, the user configuration logic 46 may communicate a reconfiguration signal with the IP HDL module 24 to determine which of the stored parameter settings correspond to the desired function. After this determination, the IP HDL module 24 may implement the stored parameter settings, via the reconfiguration logic 22, which are subsequently loaded on the hardened IP block 30 of the FPGA 10. In this manner, the designer may transition between the configuration profiles of the hardened IP block 30 by simply selecting the desired configuration profile 28. This may remove a step of the designer manually writing reconfiguration logic to transition between the configuration profiles.

Additionally, because the parameter configurations 28 of the configuration profiles are determined upon submitting the configuration profiles to the design software 44, compilation occurs upon a single instance. Instead of compiling the system 42 every time the hardened IP block 30 is reconfigured, the configuration profiles are compiled at a front end of a reconfiguration process. This may reduce iteration time while writing the configuration profiles and reduce implementation time while actually running the system 42, as the system 42 may not stop to compile a new configuration profile 28 every time the designer desires to change the functionality of the hardened IP block 30.

Figure 4:
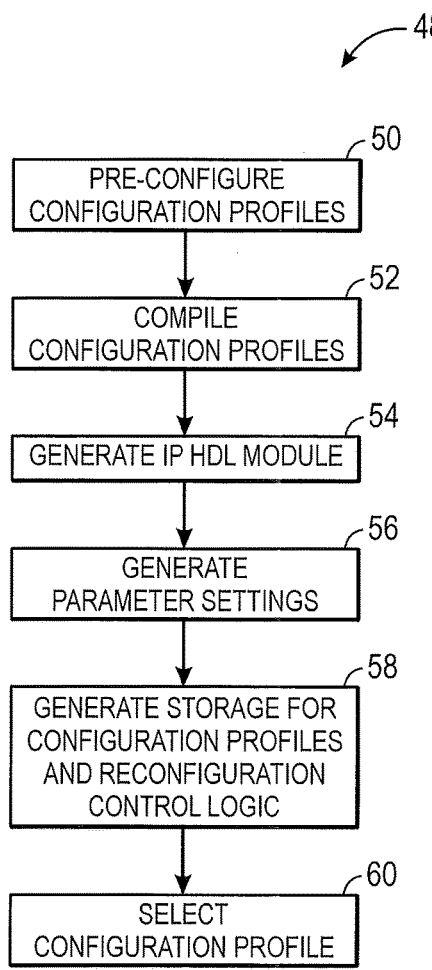
FIG. 4 is a flow chart illustrating a method for implementing reconfiguration profiles on hardened IP blocks of an integrated circuit (IC), in accordance with an embodiment.

To accomplish the reconfiguration of the hardened IP blocks 30 of the FPGA 10, FIG. 4 illustrates a method 48 for implementing the configuration profiles on hardened IP blocks 30 of the FPGA 10. Initially, at block 50, a designer may pre-configure the configuration profiles. The designer may write a high level code instructing the design software 44 how each configuration profile 28 affects the functionality of the hardened IP block 30. Additionally, the designer may write as many or as few of the configuration profiles that satisfy functions that may be desired by the designer during operation of the FPGA 10.

The configuration profiles may be written in the design software 44. After the configuration profiles are written, the FPGA 10 may compile the configuration profiles at block 52. As discussed above, all of the configuration profiles may be compiled at one time. In this manner, the designer may reduce time lost through extra compilation iterations, and the designer may reduce time lost if the configuration profiles were individually compiled during each reconfiguration of the hardened IP block 30.

Subsequently, at block 54, the design software 44 may generate the IP HDL module 24. As discussed above, the IP HDL module 24 may provide a number of implementation functions. Among those functions, the IP HDL module 24 may designate space in the memory 26 for the parameter configurations 28 established by the configuration profiles, as well as implement the control logic 32 that joins the configuration profiles to the hardened IP blocks 30 via reconfiguration interface 40. As such, the IP HDL module 24 may provide an important role to the reconfiguration system 42.

Additionally, at block 56, the design software 44 may analyze the configuration profiles and generate the parameter configurations 28 for reconfiguring the hardened IP block 30. The generated parameter configurations 28 may include register settings for an FPGA, or any other memory element that may configure the hardened IP block 30. Further, generating the parameter configurations 28 may enable the designer to write the configuration profiles at a very high level, while the design software 44 converts the high level code into desired low level device parameter interactions. In this manner, the design software 44 may increase access to altering the configuration profiles by designers unfamiliar with register maps of the FPGA 10. Furthermore, the high level coding may limit configuration errors common during manual dynamic reconfiguration of the hardened IP block 30.

At block 58, the IP HDL module 24 may implement storage for the parameter configurations 28 and the reconfiguration logic 22. The implementation of storage for the parameter configurations 28 and the reconfiguration logic 22 may include designating space within ROM, RAM, registers, LUTs, etc. to store the parameter configurations 28 and the reconfiguration logic 22. In this manner, the parameter configurations 28 and the reconfiguration logic 22 are called from a designated memory location during reconfiguration of the hardened IP blocks 30.

Subsequently, at block 60, one or more of the parameter configurations 28 are selected for implementation in the hardened IP block 30. For example, after the configuration profiles are written, compiled, and mapped to the parameter configurations 28, the designer may select the desired configuration profiles, and, thus, the desired parameter configurations 28, based on the functionalities of the configuration profiles and the functions desired by the designer for a specific application. Upon selecting the desired configuration profiles, the user reconfiguration logic 46 may instruct the reconfiguration logic 22 to retrieve the parameter configurations 28 in the memory 26 and map the parameter settings of the parameter configurations 28 to the hardened IP block 30 via the reconfiguration interface 40. At this point, reconfigured hardened IP blocks 30 are loaded to the respective hardened IP block sections of the FPGA 10.

While the blocks 50-60 are described in a particular order above, it may be noted that the blocks are not constrained to the particular order. Indeed, the blocks 50-60 may be rearranged into any suitable order, as a designer may see fit, to provide a desired reconfiguration result. Therefore, the above description of the method 48 is intended only as an example of an order in which the blocks 50-60 may be accomplished.

Figure 5:
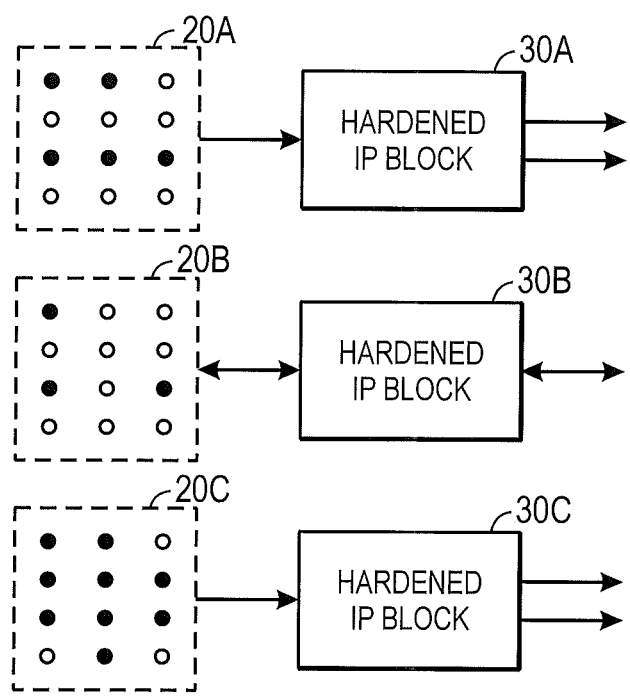
FIG. 5 is a block diagram of representations of configurations for programmable elements of the programmable logic device of FIG. 1, in accordance with an embodiment.

With the foregoing in mind, the programmable elements 20 of the FPGA 10 may change the logic function of the hardened IP blocks 30. As such, FIG. 5 is a block diagram illustrating effects of differing configurations of programmable elements 20a, 20b, 20c. In this specific embodiment, the programmable elements 30a, 30b, 30c may represent simplified sets of registers for the FPGA 10. Each of the programmable elements 20a, 20b, 20c may provide a unique functionality of respective hardened IP blocks 30a, 30b, 30c. For example, the hardened IP blocks 30a, 30b, 30c may be representations of a transceiver capable of operating at 1250 megabits per second (Mbps) or 2500 Mbps (e.g., as described in U.S. patent application Ser. No. 14/045,643, filed on Oct. 3, 2013, the disclosure of which is hereby incorporated by reference in its entirety for all purposes). The differences between the hardened IP blocks 30a, 30b, 30c may result in differing functionalities within limits that the transceiver is operable.

For example, the configuration profile represented by the programmable elements 20a may represent a register configuration of the hardened IP block 30a. In this example, the programmable elements 20a indicate the register configuration and, thus, the functionality of the hardened IP block 30a. The register configuration represented by the programmable elements 20a displays five registers indicated as high by filled circles. The remaining empty circles may represent registers set to low. This particular configuration may indicate that the hardened IP block 30a is configured to have the functionality represented by the arrows going into and coming from the hardened IP block 30a. That is, the hardened IP block 30a may have one input and two outputs based on the configuration of the programmable elements 20a.

Further, the programmable elements 20b may include a different configuration. Because the programmable elements 20b have a different configuration than the programmable elements 20a, the hardened IP block 30b may function differently from the hardened IP block 30a. In this example, three registers are set to high, while the remaining registers are set to low. This difference from the programmable elements 20a may result in the hardened IP block 30b having the functionality of two bi-directional ports instead of the one input and two outputs represented by the hardened IP block 30a.

Likewise, the programmable elements 20c may include a different configuration from the programmable elements 20a and 20b. However, the configuration of the programmable elements 20c may still produce a function in the hardened IP block 30c of one input and two outputs similar to the function in the hardened IP block 30a. The differences in configuration between the programmable elements 20c and 20a (i.e., four additional registers set to high) may result in a different speed in which the transceiver functions. For example, the configuration of the programmable elements 20a may result in the hardened IP block 30a set to run at 1250 Mbps, while the configuration of the programmable elements 20c may result in the hardened IP block 30c set to run at 2500 Mbps. The additional registers set to high in the configuration of the programmable elements 20c may create a change in speed at which the transceiver functions.

Furthermore, during a transition between the configurations of the programmable elements 20a, 20b, 20c, it may be appreciated that only the circles (i.e., registers) that differ from the previous configuration are changed. Therefore, instead of reconfiguring the programmable elements 20a, 20b, 20c from a set of all high registers or a set of all low registers, the programmable elements 20a, 20b, 20c transition dynamically a comparatively small number of registers to produce the desired function of the hardened IP block 30a, 30b, 30c. It may also be appreciated that while the programmable elements 20a, 20b, 20c are described above as registers, other elements may be used. For example, flash memory, static random-access memory (SRAM), dynamic random-access memory (DRAM), and the like may also be used.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method to implement reconfiguration of a hardened intellectual property (IP) block of an integrated circuit (IC) that includes a programmable logic fabric, comprising:
   receiving one or more pre-configured profiles that provide one or more distinct configurations of the hardened IP block;
   generating configuration data associated with each of the distinct configurations of the hardened IP block;
   designating configuration storage space to store the configuration data; and
   generating reconfiguration control logic to be implemented on the programmable logic fabric of the IC, wherein the reconfiguration control logic reads the configuration data and programs the hardened IP block with the configuration data.

2. The method of claim 1, wherein the configuration data comprises register settings of the hardened IP block.

3. The method of claim 1, comprising:
determining similarities between the configuration data of the distinct configurations; and
reconfiguring only portions of the hardened IP block that are dissimilar.

4. The method of claim 1, wherein the hardened IP block comprises configurable sets of registers.

5. The method of claim 1, wherein designating the configuration storage space to store the configuration data comprises designating storage areas on read-only memory (ROM).

6. The method of claim 1, comprising:
receiving commands selecting one or more of the pre-configured profiles; and
reconfiguring the hardened IP block with the one or more pre-configured profiles.

7. The method of claim 1, comprising generating user reconfiguration logic that links user input to the reconfiguration control logic.

8. The method of claim 1, comprising programming the configuration data to the hardened IP block via a reconfiguration interface.

9. The method of claim 1, comprising reconfiguring the hardened IP block to change a functionality of the hardened IP block.

10. The method of claim 1, wherein the method is configured to be carried out on an integrated circuit (IC) device, comprising:
one or more of the hardened intellectual property (IP) blocks reconfigurable at runtime via one or more of the pre-configured profiles; and
one or more interface ports that receive the pre-configured profiles to reconfigure the hardened IP blocks during runtime, wherein the pre-configured profiles are selected and implemented via the reconfiguration control logic.

11. The method of claim 10, wherein the method is configured to be carried out on the IC device comprising a memory device that stores the one or more pre-configured profiles.

12. The method of claim 10, wherein the method is configured to be carried out on the IC device comprising a memory device that stores the one or more pre-configured profiles and the control logic.

13. The method of claim 10, wherein the pre-configured profiles are associated with register settings of the hardened IP blocks.

14. A method to implement reconfiguration of a hardened intellectual property (IP) block of an integrated circuit (IC) that includes a programmable logic fabric, comprising:
receiving one or more pre-configured profiles providing configurations of the hardened IP block;
generating configuration data from the pre-configured profiles;
generating an IP hardware description language (HDL) module that stores the configuration data and generates reconfiguration control logic to be implemented on the programmable fabric of the IC, wherein the reconfiguration control logic reads the configuration data and implements the configuration data in the hardened IP block; and
receiving and implementing the configuration data at the hardened IP block provided by the reconfiguration control logic.

15. The method of claim 14, wherein generating the configuration data comprises generating register settings associated with the hardened IP block from the pre-configured profiles.

16. The method of claim 14, wherein generating register settings comprises generating register settings of a set of registers associated with each of the pre-configured profiles.

17. The method of claim 16, wherein implementing the configuration data comprises reconfiguring only registers of the set of registers that are configured differently from the register settings of the configuration of the hardened IP block implemented immediately prior to reconfiguration.

18. The method of claim 14, wherein generating the IP HDL module comprises compiling the IP HDL in a single instance.

19. The method of claim 14, comprising:
receiving a signal from a reconfiguration input; and
selecting from the pre-configured profiles based on the signal from the reconfiguration input.

20. A method to implement reconfiguration of a hardened intellectual property (IP) block of an integrated circuit (IC) that includes a programmable logic fabric, comprising:
receiving one or more pre-configured profiles that provide one or more configurations of the hardened IP block;
generating configuration data associated with the one or more configurations of the hardened IP block;
generating an IP hardware description language (HDL) module that implements storage to store the configuration data and generates reconfiguration control logic to be implemented on the programmable fabric of the IC, wherein the reconfiguration control logic reads the configuration data and programs the hardened IP block with the configuration data.

21. The method of claim 10, wherein the pre-configured profiles are selected via control logic based on instructions received from a reconfiguration input.

* * * * *